US010911755B2

United States Patent
Shen et al.

(10) Patent No.: US 10,911,755 B2
(45) Date of Patent: *Feb. 2, 2021

(54) SYSTEMS AND METHODS FOR ADAPTIVE MOBILE TELECOMMUNICATIONS FOR AUTONOMOUS VEHICLES

(71) Applicant: Nuro, Inc., Mountain View, CA (US)

(72) Inventors: Yi Shen, Mountain View, CA (US); Calvin Giroud, Mountain View, CA (US)

(73) Assignee: Nuro, Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/792,487

(22) Filed: Feb. 17, 2020

(65) Prior Publication Data

US 2020/0344470 A1    Oct. 29, 2020

Related U.S. Application Data

(63) Continuation of application No. 16/391,855, filed on Apr. 23, 2019, now Pat. No. 10,623,734.

(51) Int. Cl.
*H04N 19/11* (2014.01)
*H04N 19/61* (2014.01)
(Continued)

(52) U.S. Cl.
CPC .......... *H04N 19/11* (2014.11); *H04L 43/0811* (2013.01); *H04L 43/0894* (2013.01);
(Continued)

(58) Field of Classification Search
CPC .... H04N 19/11; H04N 19/61; H04L 43/0894; H04L 43/0811; H04W 28/0215; H04W 64/006
(Continued)

(56) References Cited

U.S. PATENT DOCUMENTS 9,008,890 B1    4/2015  Herbach et al.
9,494,935 B2   11/2016  Okumura et al.
(Continued)

FOREIGN PATENT DOCUMENTS

WO    2019018695 A1    1/2019

OTHER PUBLICATIONS

International Search Report and Written Opinion in counterpart International Application No. PCT/US2020/025881, dated Jun. 26, 2020, 13 pages.

*Primary Examiner* — Allen C Wong

(57) ABSTRACT

An autonomous land vehicle in accordance with aspects of the present disclosure includes a land vehicle conveyance system, at least two telecommunication devices, an imaging device configured to capture image data of a surrounding environment, a video encoder configured to encode the image data, one or more processors, and at least one memory storing instructions. The telecommunication devices can perform wireless communication independently of each other and can simultaneously perform wireless communication. The instructions, when executed by the processor(s), cause the vehicle to travel using the conveyance system, determine a communication capability of the telecommunication devices while the conveyance system performs travel, determine a compression rate for the video encoder based on the communication capability, encode the image data using the video encoder based on the compression rate to generate encoded data, and communicate the encoded data using at least one telecommunication device based on the communication capability.

20 Claims, 9 Drawing Sheets

(51) Int. Cl.
  *H04L 12/26*   (2006.01)
  *H04W 64/00*   (2009.01)
  *H04W 28/02*   (2009.01)

(52) U.S. Cl.
  CPC ........ *H04N 19/61* (2014.11); *H04W 28/0215* (2013.01); *H04W 64/006* (2013.01)

(58) Field of Classification Search
  USPC .................................................. 375/240.12
  See application file for complete search history.

(56) References Cited

U.S. PATENT DOCUMENTS

| | | |
|---|---|---|
| 9,507,346 B1 | 11/2016 | Levinson et al. |
| 2010/0074271 A1* | 3/2010 | Iwamura ............... H04L 47/822 370/458 |
| 2011/0267452 A1* | 11/2011 | Notsu .................... H04N 5/772 348/116 |
| 2012/0197519 A1* | 8/2012 | Richardson ........ G01C 21/3647 701/408 |
| 2014/0019593 A1 | 1/2014 | Reznik et al. |
| 2014/0136414 A1 | 5/2014 | Abhyanker |
| 2015/0006005 A1 | 1/2015 | Yu et al. |
| 2015/0071140 A1* | 3/2015 | Tarighat Mehrabani .................... H04W 88/00 370/311 |
| 2015/0326941 A1* | 11/2015 | Gao .................. H04N 21/4402 725/74 |
| 2016/0323620 A1* | 11/2016 | Kim .................. H04N 21/4122 |
| 2017/0123421 A1* | 5/2017 | Kentley ................ G08G 1/202 |
| 2018/0213015 A1 | 7/2018 | Jain |

\* cited by examiner

SYSTEMS AND METHODS FOR ADAPTIVE MOBILE TELECOMMUNICATIONS FOR AUTONOMOUS VEHICLES

CROSS REFERENCE TO RELATED APPLICATIONS

This application is a continuation, and claims the benefit, of U.S. application Ser. No. 16/391,855, filed Apr. 23, 2019, the entirety of which is incorporated herein by reference.

FIELD OF THE TECHNOLOGY

The present application relates to autonomous vehicles, and in particular, to adaptive mobile telecommunications on autonomous vehicles.

BACKGROUND

The field of fully-autonomous and/or semi-autonomous robots is a growing field of innovation. Robots are being used for many purposes including warehouse inventory operations, household vacuuming robots, hospital delivery robots, sanitation robots, and military or defense applications.

In the consumer space, handling and delivery of goods and services by autonomous vehicles could improve society in many ways. For example, rather than spending time traveling to a merchant, a person can instead engage in productive work while waiting for an autonomous vehicle to deliver the goods and/or services. With fewer vehicles on the road, traffic conditions would also improve. For example, instead of several people traveling to merchants in several vehicles, a single autonomous vehicle could deliver goods and/or services to those people and thereby reduce the number of vehicles on the road. Other uses and applications for autonomous vehicles are possible as technology progresses. Accordingly, there is interest in developing technologies for autonomous vehicles.

SUMMARY

The present disclosure relates to a fully-autonomous and/or semi-autonomous robot vehicles. In one aspect, the present disclosure provides systems and method for an autonomous vehicle to communicate in different communication environments using multiple telecommunication devices and/or using adaptive data compression.

In accordance with aspects of the present disclosure, an autonomous robot vehicle includes a land vehicle conveyance system, at least two telecommunication devices that are configured to perform wireless communication independently of each other and that are capable of simultaneously performing wireless communication while the land vehicle conveyance system performs travel, an imaging device configured to capture image data of a surrounding environment, a video encoder configured to encode the image data, one or more processors, and at least one memory coupled to the one or more processors. The memory stores instructions which, when executed by the one or more processors, cause the autonomous land vehicle to travel using the land vehicle conveyance system, determine a communication capability of the at least two telecommunication devices while the land vehicle conveyance system performs travel, determine a compression rate for the video encoder based on the communication capability, encode the image data using the video encoder based on the compression rate to generate encoded data, and communicate the encoded data using at least one of the at least two telecommunication devices based on the communication capability.

In various embodiments, the communication capability includes a total communication capacity of the at least two telecommunication devices. In various embodiments, the compression rate for a first lower total communication capacity is higher than the compression rate for a second higher total communication capacity. In various embodiments, the compression rate is no compression when the communication capability is sufficient to communicate the image data without compression.

In various embodiments, in determining the compression rate for the video encoder, the instructions, when executed by the one or more processors, cause the autonomous land vehicle to determine the compression rate based further on a travel speed of the land vehicle conveyance system. In various embodiments, a compression rate for a first lower travel speed is lower than a compression rate for a second higher travel speed.

In various embodiments, in determining the communication capability of the at least two telecommunication devices, the instructions, when executed by the one or more processors, cause the autonomous land vehicle to determine that communication is unstable over a telecommunication device of the at least two telecommunication devices, and in communicating the encoded data using at least one of the at least two telecommunication devices, the instructions, when executed by the one or more processors, cause the autonomous land vehicle to communicate the encoded data without using the telecommunication device having the unstable communication.

In various embodiments, in communicating the encoded data, the instructions, when executed by the one or more processors, cause the autonomous land vehicle to communicate the encoded data using the at least two telecommunication devices simultaneously.

In various embodiments, in communicating the encoded data using the at least two telecommunication devices simultaneously, the instructions, when executed by the one or more processors, cause the autonomous land vehicle to process the encoded data into packets, and distribute the packets to the at least two telecommunication devices.

In various embodiments, in determining the communication capability of the at least two telecommunication devices, the instructions, when executed by the one or more processors, cause the autonomous land vehicle to successively determine the communication capability of the at least two telecommunication devices, and in determining the compression rate for the video encoder, the instructions, when executed by the one or more processors, cause the autonomous land vehicle to successively determine the compression rate for the video encoder based on the communication capability.

In various embodiments, a time period for successively determining the communication capability and a time period for successively determining the compression rate are based on a travel speed of the land vehicle conveyance system.

In various embodiments, the time period for successively determining the communication capability and the time period for successively determining the compression rate, for a first higher travel speed, is shorter than the time period for successively determining the communication capability and the time period for successively determining the compression rate, for a second lower travel speed.

In accordance with aspects of the present disclosure, a method is disclosed for an autonomous land vehicle having a land vehicle conveyance system and at least two telecommunication devices that are configured to perform wireless communication independently of each other and that are capable of simultaneously performing wireless communication while the autonomous vehicle performs travel. The method includes capturing image data of a surrounding environment of the autonomous vehicle, traveling using the land vehicle conveyance system, determining a communication capability of the at least two telecommunication devices while the land vehicle conveyance system performs travel, determining a compression rate based on the communication capability, encoding the image data based on the compression rate to generate encoded data, and communicating the encoded data using at least one of the at least two telecommunication devices based on the communication capability.

In various embodiments, the communication capability includes a total communication capacity of the at least two telecommunication devices. In various embodiments, the compression rate for a first lower total communication capacity is higher than the compression rate for a second higher total communication capacity.

In various embodiments, determining the compression rate includes determining the compression rate based further on a travel speed of the land vehicle conveyance system. In various embodiments, a compression rate for a first lower travel speed is lower than a compression rate for a second higher travel speed.

In various embodiments, the method includes processing the encoded data into packets, and distributing the packets to the at least two telecommunication devices.

In various embodiments, determining the communication capability of the at least two telecommunication devices includes successively determine the communication capability of the at least two telecommunication devices, and determining the compression rate includes successively determining the compression rate based on the communication capability.

In various embodiments, a time period for successively determining the communication capability and a time period for successively determining the compression rate are based on a travel speed of the land vehicle conveyance system.

Further details and aspects of exemplary embodiments of the present disclosure are described in more detail below with reference to the appended figures.

INCORPORATION BY REFERENCE

All publications, patents, and patent applications mentioned in this specification are incorporated by reference herein to the same extent as if each individual publication, patent, or patent application was specifically and individually indicated to be incorporated by reference.

BRIEF DESCRIPTION OF THE DRAWINGS

A better understanding of the features and advantages of the disclosed technology will be obtained by reference to the following detailed description that sets forth illustrative embodiments, in which the principles of the technology are utilized, and the accompanying drawings of which.

DETAILED DESCRIPTION

Figure 1:
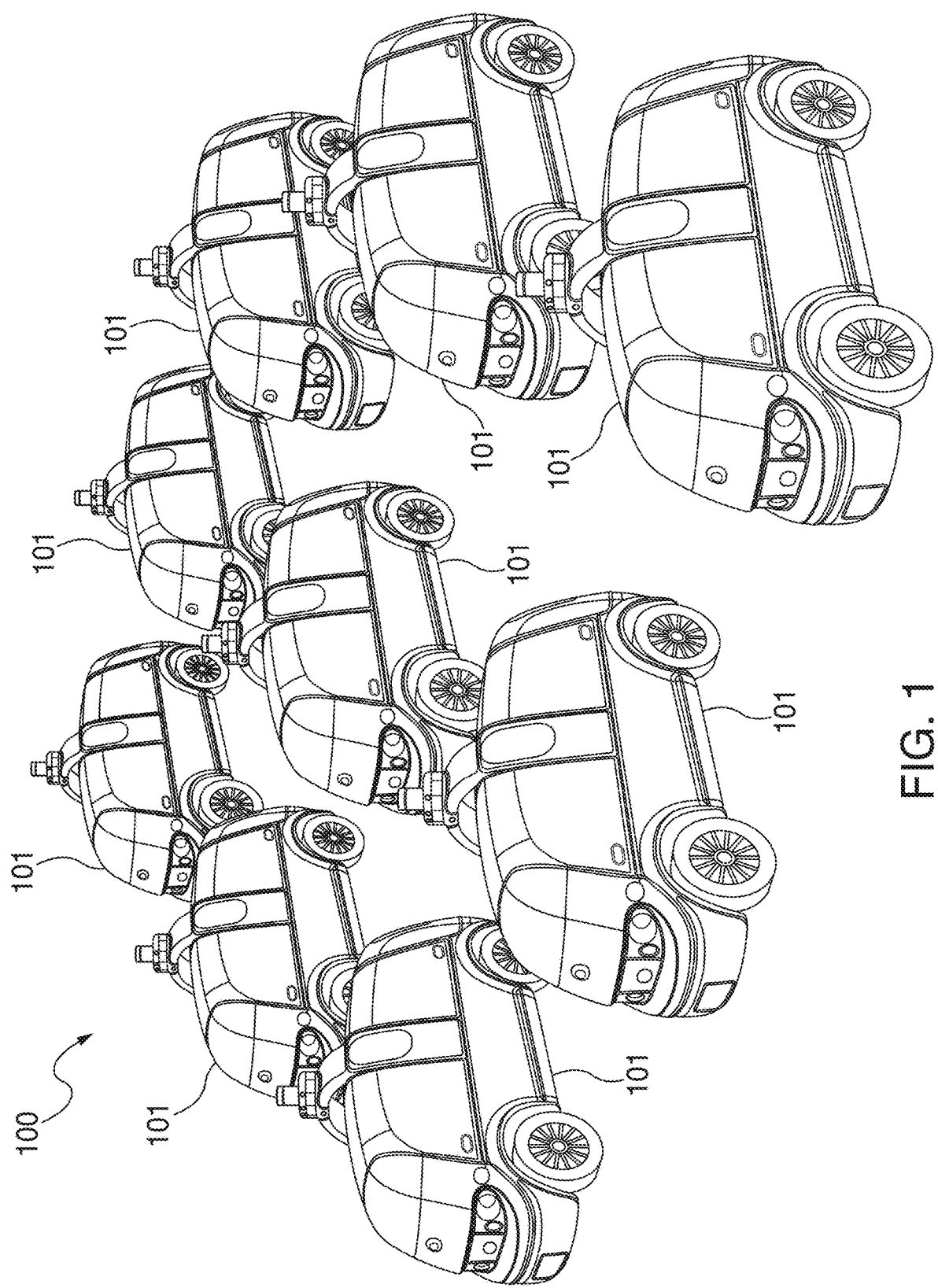
FIG. 1 is an exemplary view an autonomous robot fleet.

This disclosure relates to a fully-autonomous and/or semi-autonomous robot fleet and to systems and method for an autonomous vehicle to communicate in different communication environments using multiple telecommunication devices and/or using adaptive data compression. In one aspect, the present disclosure provides systems and methods for remote operation of autonomous vehicles by human operators. Remote operation of a fully-autonomous or a semi-autonomous vehicle may be appropriate in various situations. For example, if the autonomous vehicle is requested to travel to a destination that has not been fully mapped (e.g., large corporate or university campuses, or public parks, etc.), the autonomous vehicle may not be able to determine how to reach the destination. Accordingly, the capability for a human operator to remotely operate an autonomous vehicle is a beneficial feature. However, with the human operator being remote from the autonomous vehicle, communications between the human operator and the autonomous vehicle should be as reliable as possible. The remote human operator situation is exemplary, and other situations may require reliable communications with an autonomous vehicle. In accordance with aspects of the present disclosure, systems and method are provided for an autonomous vehicle to communicate in different communication environments using multiple telecommunication devices and/or using adaptive data compression.

Provided herein is a robot fleet having robot vehicles operating fully-autonomously or semi-autonomously and a fleet management module for coordination of the robot fleet, where each robot within the fleet is configured for transporting, delivering or retrieving goods or services and is capable of operating in an unstructured open or closed environment. Each robot can include a power system, a conveyance system, a navigation module, at least one securable compartment or multiple securable compartments to hold goods, a controller configurable to associate each of the securable compartments to an assignable customer a customer group within a marketplace, or provider and provide entry when authorized, a communication module and a processor configured to manage the conveyance system, the navigation module, the sensor system, the communication module and the controller.

As used herein, the term "autonomous" includes fully-autonomous, semi-autonomous, and any configuration in which a vehicle can operate in a controlled manner for a period of time without human intervention.

As used herein, the term "fleet," "sub-fleet," and like terms are used to indicate a number of land vehicles operating together or under the same ownership. In some embodiments the fleet or sub-fleet is engaged in the same activity. In some embodiments, the fleet or sub-fleet are engaged in similar activities. In some embodiments, the fleet or sub-fleet are engaged in different activities.

As used herein, the term "robot," "robot vehicle," "robot fleet," "vehicle," "all-terrain vehicle," and like terms are used to indicate a mobile machine that transports persons, cargo, items, and/or goods. Typical vehicles include cars, wagons, vans, unmanned motor vehicles (e.g., tricycles, trucks, trailers, buses, etc.), and unmanned railed vehicles (e.g., trains, trams, etc.), among other types of land vehicles.

As used herein, the term "user," "operator," "fleet operator," and like terms are used to indicate the entity that owns or is responsible for managing and operating the robot fleet.

As used herein, the term "customer" and like terms are used to indicate the entity that requests the services provided the robot fleet.

As used herein, the term "provider," "business," "vendor," "third party vendor," and like terms are used to indicate an entity that works in concert with the fleet owner or operator to utilize the services of the robot fleet to deliver the provider's product from and or return the provider's product to the provider's place of business or staging location.

As used herein, the term "server," "computer server," "central server," "main server," and like terms are used to indicate a computer or device on a network that manages the fleet resources, namely the robot vehicles.

As used herein, the term "controller" and like terms are used to indicate a device that controls the transfer of data from a computer to a peripheral device and vice versa. For example, disk drives, display screens, keyboards, and printers all require controllers. In personal computers, the controllers are often single chips. As used herein the controller is commonly used for managing access to components of the robot such as the securable compartments.

As used herein a "mesh network" is a network topology in which each node relays data for the network. All mesh nodes cooperate in the distribution of data in the network. It can be applied to both wired and wireless networks. Wireless mesh networks can be considered a type of "Wireless ad hoc" network. Thus, wireless mesh networks are closely related to Mobile ad hoc networks (MANETs). Although MANETs are not restricted to a specific mesh network topology, Wireless ad hoc networks or MANETs can take any form of network topology. Mesh networks can relay messages using either a flooding technique or a routing technique. With routing, the message is propagated along a path by hopping from node to node until it reaches its destination. To ensure that all its paths are available, the network must allow for continuous connections and must reconfigure itself around broken paths, using self-healing algorithms such as Shortest Path Bridging. Self-healing allows a routing-based network to operate when a node breaks down or when a connection becomes unreliable. As a result, the network is typically quite reliable, as there is often more than one path between a source and a destination in the network. This concept can also apply to wired networks and to software interaction. A mesh network whose nodes are all connected to each other is a fully connected network.

As used herein, the term "module" and like terms are used to indicate a self-contained hardware component of the central server, which in turn includes software modules. In software, a module is a part of a program. Programs are composed of one or more independently developed modules that are not combined until the program is linked. A single module can contain one or several routines, or sections of programs that perform a particular task. As used herein the fleet management module includes software modules for managing various aspects and functions of the robot fleet.

As used herein, the term "processor," "digital processing device" and like terms are used to indicate a microprocessor or central processing unit (CPU). The CPU is the electronic circuitry within a computer that carries out the instructions of a computer program by performing the basic arithmetic, logical, control and input/output (I/O) operations specified by the instructions.

In accordance with the description herein, suitable digital processing devices include, by way of non-limiting examples, server computers, desktop computers, laptop computers, notebook computers, sub-notebook computers, netbook computers, netpad computers, set-top computers, handheld computers, Internet appliances, mobile smartphones, tablet computers, personal digital assistants, video game consoles, and vehicles. Those of skill in the art will recognize that many smartphones are suitable for use in the system described herein. Suitable tablet computers include those with booklet, slate, and convertible configurations, known to those of skill in the art.

In some embodiments, the digital processing device includes an operating system configured to perform executable instructions. The operating system is, for example, software, including programs and data, which manages the device's hardware and provides services for execution of applications. Those of skill in the art will recognize that suitable server operating systems include, by way of non-limiting examples, FreeBSD, OpenBSD, NetBSD®, Linux, Apple® Mac OS X Server®, Oracle® Solaris®, Windows Server®, and Novell® NetWare®. Those of skill in the art will recognize that suitable personal computer operating systems include, by way of non-limiting examples, Microsoft® Windows®, Apple® Mac OS X®, UNIX®, and UNIX-like operating systems such as GNU/Linux®. In some embodiments, the operating system is provided by cloud computing. Those of skill in the art will also recognize that suitable mobile smart phone operating systems include, by way of non-limiting examples, Nokia® Symbian® OS, Apple® iOS®, Research In Motion® BlackBerry OS®, Google® Android®, Microsoft® Windows Phone® OS, Microsoft® Windows Mobile® OS, Linux®, and Palm® WebOS®.

In some embodiments, the device includes a storage and/or memory device. The storage and/or memory device is one or more physical apparatus used to store data or programs on a temporary or permanent basis. In some embodiments, the device is volatile memory and requires power to maintain stored information. In some embodiments, the device is non-volatile memory and retains stored information when the digital processing device is not powered. In some embodiments, the non-volatile memory includes flash memory. In some embodiments, the non-volatile memory includes dynamic random-access memory (DRAM). In some embodiments, the non-volatile memory includes ferroelectric random access memory (FRAM). In some embodiments, the non-volatile memory includes phase-change random access memory (PRAM). In some embodiments, the device is a storage device including, by way of non-limiting examples, CD-ROMs, DVDs, flash memory devices, magnetic disk drives, magnetic tapes drives, optical disk drives, and cloud computing based storage. In some embodiments, the storage and/or memory device is a combination of devices such as those disclosed herein.

In some embodiments, the digital processing device includes a display to send visual information to a user. In some embodiments, the display is a cathode ray tube (CRT). In some embodiments, the display is a liquid crystal display (LCD). In some embodiments, the display is a thin film transistor liquid crystal display (TFT-LCD). In some embodiments, the display is an organic light emitting diode (OLED) display. In various some embodiments, on OLED display is a passive-matrix OLED (PMOLED) or active-matrix OLED (AMOLED) display. In some embodiments, the display is a plasma display. In some embodiments, the display is a video projector. In some embodiments, the display is interactive (e.g., having a touch screen or a sensor such as a camera, a 3D sensor, a LiDAR, a radar, etc.) that can detect user interactions/gestures/responses and the like. In still some embodiments, the display is a combination of devices such as those disclosed herein.

The Fleet of Robot Vehicles

Provided herein is a robot fleet 100, as illustrated in FIG. 1, having autonomous vehicles 101, with each one operating fully-autonomously or semi-autonomously.

Figure 2:
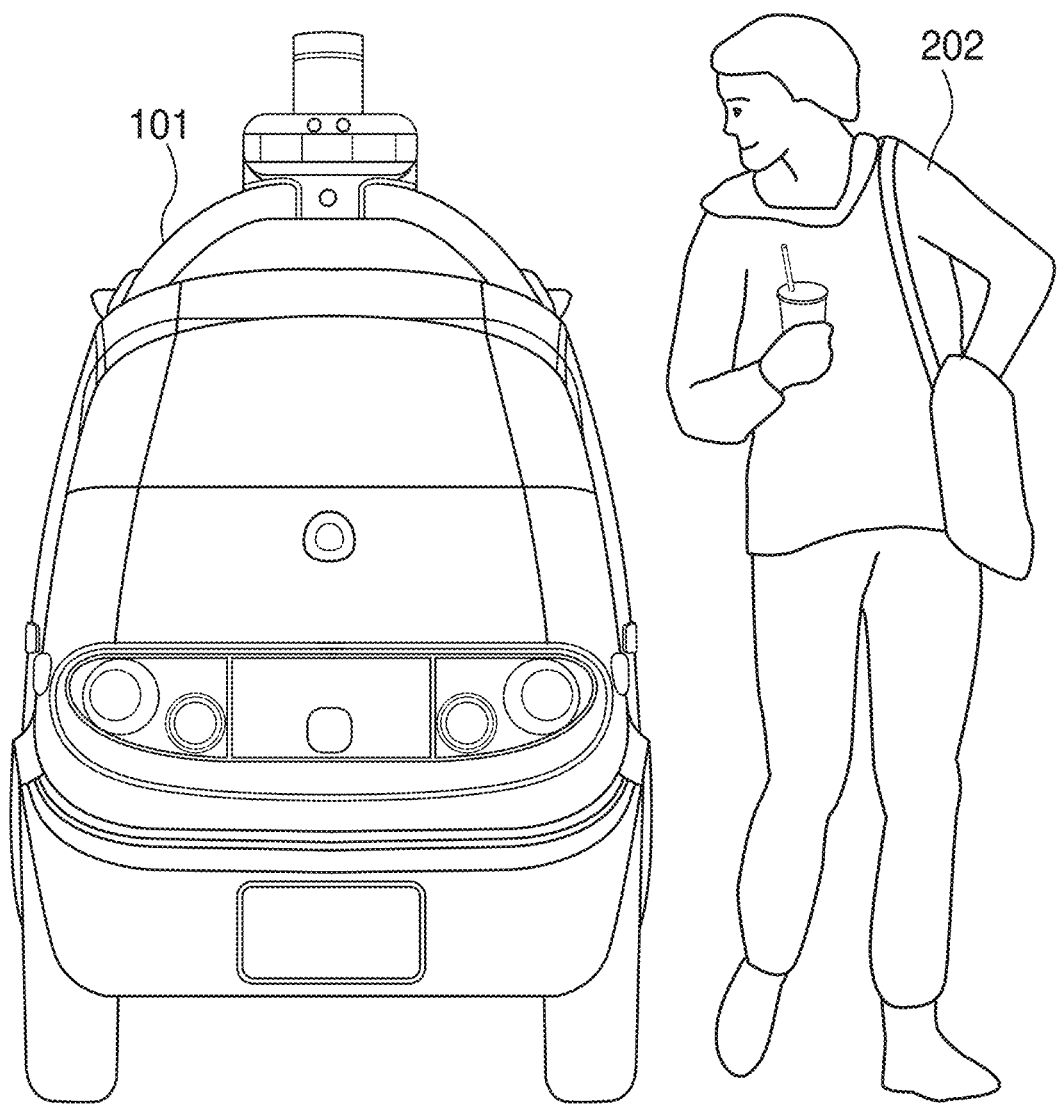
FIG. 2 is an exemplary front view of a robot vehicle in the autonomous robot fleet of FIG. 1, shown in comparison to the height of an average person.

As illustrated in FIG. 2, one exemplary configuration of an autonomous vehicle 101 is a vehicle configured for land travel, such as a small fully-autonomous (or semi-autonomous) automobile. The exemplary fully-autonomous (or semi-autonomous) automobile is narrow (i.e., 2-5 feet wide), has low mass and low center of gravity for stability, has multiple secure compartments assignable to one or more customers, retailers and/or vendors, and is designed for moderate working speed ranges (i.e., 1.0-45.0 mph) to accommodate inner-city and residential driving speeds. Additionally, in some embodiments, the land vehicle robot units in the fleet are configured with a maximum speed range from 1.0 mph to about 90.0 mph for high speed, intrastate or interstate driving. Each robot in the fleet is equipped with onboard sensors (e.g., cameras (running at a high frame rate, akin to video), LiDAR, radar, ultrasonic sensors, microphones, etc.) and internal computer processing to constantly determine where it can safely navigate, what other objects are around each robot, and what it may do.

In in some embodiments, the robot fleet is fully-autonomous.

Figure 3:
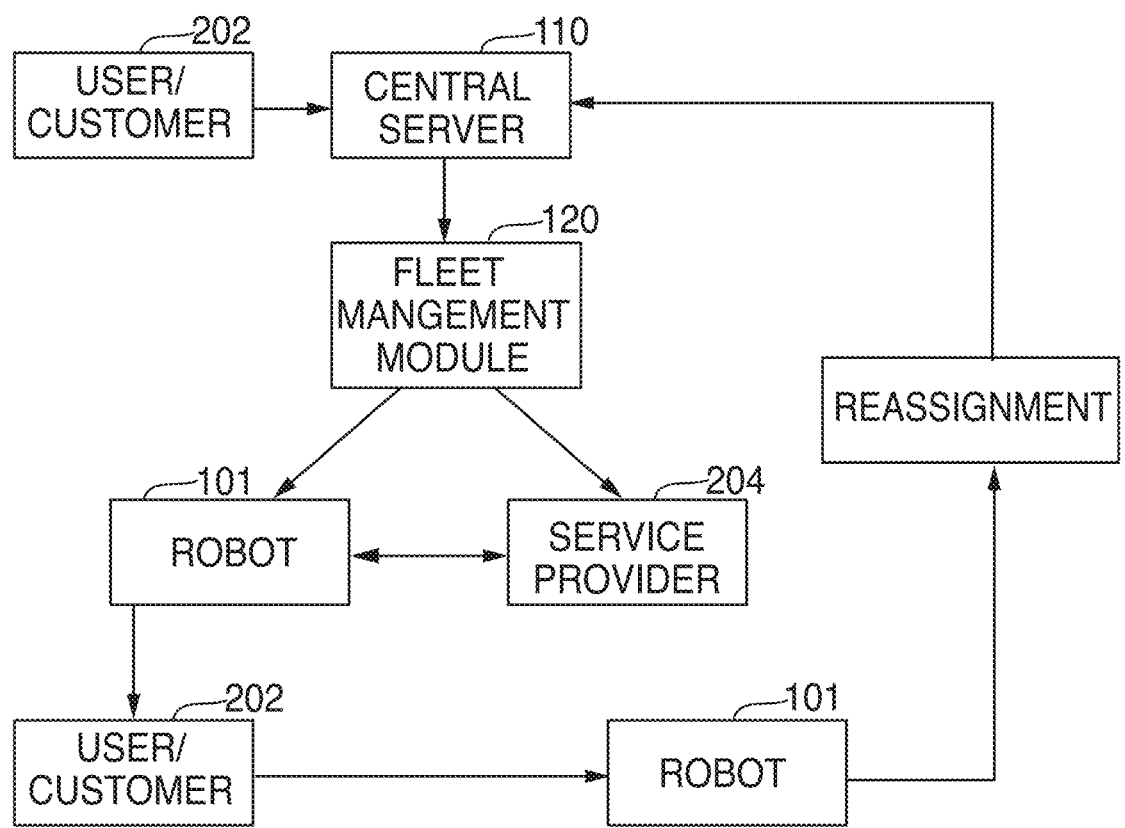
FIG. 3 is an exemplary flowchart representation of the logic for a fleet management control module associated with a central server for the robot fleet.

In in some embodiments, the robot fleet is semi-autonomous. In some embodiments, and as shown in FIG. 3, it may be necessary to have human interaction between the autonomous vehicle 101, a fleet operator, the provider 204 and/or the customer 202 to address previously unforeseen issues (e.g., a malfunction with the navigation module, provider inventory issues, unanticipated traffic or road conditions, or direct customer interaction after the robot arrives at the customer location).

In some embodiments, the robot fleet 100 is controlled directly by the user 202. In some embodiments, it may be necessary to have direct human interaction between the autonomous vehicle 101 and/or the fleet operator to address maintenance issues such as mechanical failure, electrical failure or a traffic accident. Aspects of the present disclosure relating to remote operation of the robot vehicles by a human operator will be described in more detail in connection with FIGS. 5-7.

In some embodiments, the robot fleet is configured for land travel. In some embodiments, each robot land vehicle in the fleet is configured with a working speed range from 13.0 mph to 45.0 mph. In some embodiments, the land vehicle robot units in the fleet are configured with a maximum speed range from 13.0 mph to about 90.0 mph.

In some embodiments of the robot fleet, the autonomous robots within the fleet are operated on behalf of third party vendor/service provider.

For example, a fleet management service is established to provide a roving delivery service for a third party beverage/food provider (e.g., a coffee service/experience for a third party vendor). It is conceived that the fleet management service would provide a sub-fleet of "white label" vehicles carrying the logo and products of that third party beverage/food provider to operate either fully-autonomously or semi-autonomously to provide this service.

In some embodiments of the robot fleet, the autonomous robots within the fleet are further configured to be part of a sub-fleet of autonomous robots, and each sub-fleet is configured to operate independently or in tandem with multiple sub-fleets having two or more sub-fleets.

For example, a package delivery service is configured to offer multiple levels of service such as "immediate dedicated rush service," "guaranteed morning/afternoon delivery service," or "general delivery service." A service provider could then have a dedicated sub-fleet of delivery vehicles for each type of service within their overall fleet of vehicles. In yet another example, a third party has priority over a certain number of vehicles in the fleet. In so doing, they can guarantee a certain level of responsiveness. When they are not using the vehicles, the vehicles are used for general services within the fleet (e.g., other third parties).

In some embodiments, the robot fleet is controlled directly by the user.

In some embodiments, there will likely be times when a vehicle breaks down, has an internal system or module failure or is in need of maintenance. For example, in the event that the navigation module should fail, each robot within the fleet is configurable to allow for direct control of the robot's processor to override the conveyance and sensor systems (i.e., cameras, etc.) by a fleet operator to allow for the safe return of the vehicle to a base station for repair.

The Operating Environments

In some embodiments, an unstructured open environment is a non-confined geographic region accessible by navigable pathways, including, for example, public roads, private roads, bike paths, open fields, open public lands, open private lands, and/or pedestrian walkways.

In some embodiments, a closed environment is a confined, enclosed or semi-enclosed structure accessible by navigable pathways, including, for example, open areas or rooms within commercial architecture, with or without structures or obstacles therein, public or dedicated aisles, hallways, tunnels, ramps, elevators, conveyors, and/or pedestrian walkways.

In some embodiments, the navigation module controls routing of the conveyance system of the robots in the fleet in the unstructured open or closed environments.

The Fleet Management Module

In some embodiments of the robot fleet 100, the fleet includes a fleet management module 120 (associated with a central server) for coordination of the robot fleet 100 and assignment of tasks for each autonomous vehicle 101 in the fleet. The fleet management module coordinates the activity and positioning of each robot in the fleet. In addition to communicating with the robot fleet, fleet owner/operator and/or user, the fleet management module also communicates with providers/vendors/businesses and customers to optimize behavior of the entire system.

The fleet management module works in coordination with a central server 110, typically located in a central operating facility owned or managed by the fleet owner 200.

As illustrated in FIG. 3, in various embodiments, a request is sent to a central server 110 (typically located at the fleet owner's or fleet manager's location), which then communicates with the fleet management module 120. The fleet management module then relays the request to the appropriate provider 204 of the service (e.g., restaurant, delivery service, vendor or retailer) and an appropriate robot or autonomous vehicle 101 in the fleet. The best appropriate robot(s) in the fleet within the geographic region and typically closest to the service provider, is then assigned the task, and the provider of the service 204 then interacts with that autonomous vehicle 101 at their business (e.g., loading it with goods, if needed). The robot then travels to the customer 202 and the customer interacts with the robot to retrieve their goods or service (e.g., the goods ordered). An interaction can include requesting the robot to open its compartment 102, 104 through the customer's app or through a user interface on the robot itself (using, e.g., RFID reader and customer phone, a touchpad, a keypad, voice commands, vision-based recognition of the person, etc.). Upon completion of the delivery (or retrieval, if appropriate), the robot reports completion of the assignment and reports back to the fleet management module for re-assignment.

Figure 4:
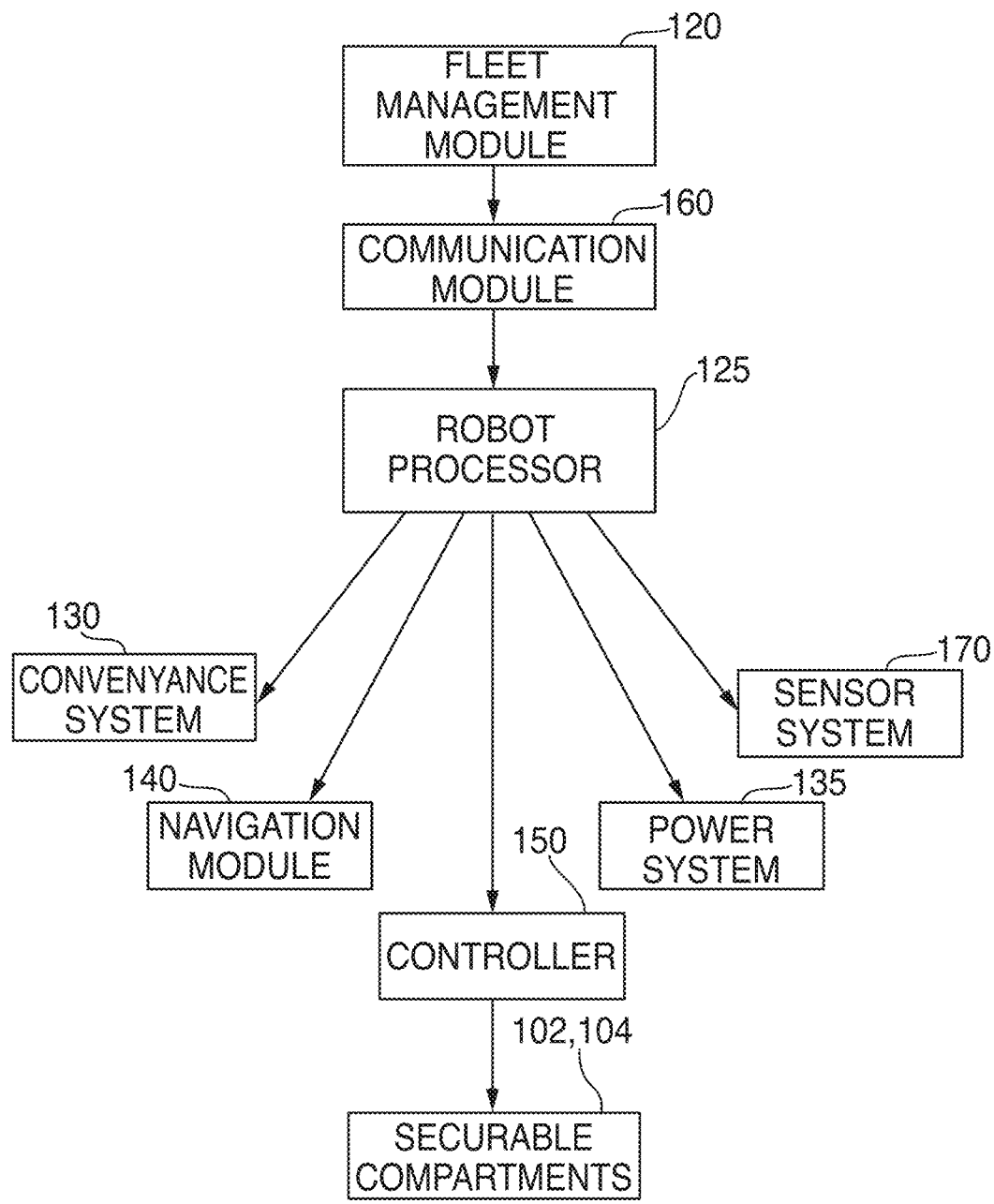
FIG. 4 is an exemplary flowchart representation of the logic flow from the Fleet Management Control Module through the robot processor to the various systems and modules of the robot.

As further illustrated in FIG. 4, and previously noted, in some embodiments, the fleet management module 120 handles coordination of the robot fleet 100 and assignment of tasks for each autonomous vehicle 101 in the fleet. The fleet management module coordinates the activity and positioning of each robot in the fleet. The fleet management module also communicates with vendors/businesses 204 and customers 202 to optimize behavior of entire system. It does this by utilizing the processor 125 to process the various inputs and outputs from each of the robot's systems and modules, including: the conveyance system 130, the power system 135, the navigation module 140, the sensor system 170, 175, the communication module 160, and the controller 150, to effectively manage and coordinate the various functions of each robot in the fleet.

In some embodiments, the robot may be requested for a pick-up of an item (e.g., a document) with the intent of delivery to another party. In this scenario, the fleet management module would assign the robot to arrive at a given location, assign a securable compartment for receipt of the item, confirm receipt from the first party to the fleet management module, then proceed to the second location where an informed receiving party would recover the item from the robot using an appropriate PIN or other recognition code to gain access to the secure compartment. The robot would then reports completion of the assignment and report back to the fleet management module for re-assignment.

Conveyance Systems

Each autonomous vehicle 101 in the fleet includes a conveyance system 130 (e.g., a drive system with a propulsion engine, wheels, treads, wings, rotors, blowers, rockets, propellers, brakes, etc.).

As noted previously, the robot fleet is configurable for land travel. Typical vehicles include cars, wagons, vans, unmanned motor vehicles (e.g., tricycles, trucks, trailers, buses, etc.), and unmanned railed vehicles (e.g., trains, trams, etc.), among other types of land vehicles.

In one exemplary embodiment, a robot land vehicle 101 is configured with a traditional 4-wheeled automotive configuration comprising conventional steering and braking systems. The drive train is configurable for standard 2-wheel drive or 4-wheel all-terrain traction drive. The propulsion system (engine) is configurable as a gas engine, a turbine engine, an electric motor and/or a hybrid gas/electric engine. Alternatively, the robot could be configured with an auxiliary solar power system 135 to provide back-up emergency power or power for minor low-power sub-systems.

Alternative configurations of components to a total drive system with a propulsion engine could include wheels, treads, wings, rotors, blowers, rockets, propellers, brakes, etc.

The Power System

In some embodiments, each robot of the robot fleet is configured with one or more power sources, which include the power system 135 (e.g., battery, solar, gasoline, propane, etc.).

Navigation Module

Each robot in the fleet further includes a navigation module 140 for navigation in the unstructured open or closed environments (e.g., digital maps, HD maps, GPS, etc.). In some embodiments, the fleet 100 relies on maps generated by the user, operator, or fleet operator, specifically created to cover the intended environment where the robot is configured to operate. These maps would then be used for general guidance of each robot in the fleet, which would augment this understanding of the environment by using a variety of on-board sensors such as cameras, LiDAR, altimeters or radar to confirm its relative geographic position and elevation.

In some embodiments, for navigation, the fleet of robots uses internal maps to provide information about where they are going and the structure of the road environment (e.g., lanes, etc.) and combine this information with onboard sensors (e.g., cameras, LiDAR, radar, ultrasound, microphones, etc.) and internal computer processing to constantly determine where they can safely navigate, what other objects are around each robot and what they may do. In still other embodiments, the fleet incorporates on-line maps to augment internal maps. This information is then combined to determine a safe, robust trajectory for the robot to follow and this is then executed by the low level actuators on the robot.

In some embodiments, the fleet relies on a global positioning system (GPS) that allows users to determine their exact location, velocity, and time 24 hours a day, in all weather conditions, anywhere in the world.

In some embodiments, the fleet of robots will use a combination of internal maps, sensors and GPS systems to confirm its relative geographic position and elevation.

In some embodiments, the autonomous fleet is strategically positioned throughout a geographic region in anticipation of a known demand.

Over time, a user 202 and/or a vendor 204 can anticipate demand for robot services by storing data concerning how many orders (and what type of orders) are made at particular times of day from different areas of the region. This can be done for both source (e.g., restaurants, grocery stores, general businesses, etc.) and destination (e.g., customer, other businesses, etc.). Then, for a specific current day and time, this stored data is used to determine what the optimal location of the fleet is given the expected demand. More concretely, the fleet can be positioned to be as close as possible to the expected source locations, anticipating these source locations will be the most likely new orders to come into the system. Even more concretely, it is possible to estimate the number of orders from each possible source in the next hour and weight each source location by this number. Then one can position the fleet so that the fleet optimally covers the weighted locations based on these numbers.

In some embodiments of the robot fleet, the positioning of robots can be customized based on: anticipated use, a pattern of historical behaviors, or specific goods being carried.

Sensor Systems

As noted previously, each robot is equipped with a sensor system 170, which includes at least a minimum number of onboard sensors (e.g., cameras (for example, those running at a high frame rate akin to video), LiDAR, radar, ultrasonic sensors, microphones, etc.) and processor 125 to constantly determine where it can safely navigate, what other objects are around each robot, and what it may do within its immediate surroundings.

In some embodiments, the robots of the robot fleet further include conveyance system sensors 175 configured to: monitor drive mechanism performance (e.g., the propulsion engine); monitor system levels of power system 135 (e.g., battery, solar, gasoline, propane, etc.); or monitor drive train performance (e.g., transmission, tires, brakes, rotors, etc.).

Communications Module

Each robot in the fleet further includes a communication module 160 configurable to receive, store and send data to the fleet management module, to a user, to and from the fleet management module 120, and to and from the robots in the fleet 100. In some embodiments, the data is related to at least user interactions and the robot fleet interactions, including, for example, scheduled requests or orders, on-demand requests or orders, or a need for self-positioning of the robot fleet based on anticipated demand within the unstructured open or closed environments.

In some embodiments, each robot in the fleet includes at least one communication module configurable to receive, store and transmit data, and to store that data to a memory device, for future data transfer or manual download.

In some embodiments, each business 204 and customer 202 has their own app/interface to communicate with the fleet operator 200 (e.g., "Nuro customer app" for customers on their phone, "Nuro vendor app" for businesses on a tablet or phone or their internal computer system, etc.).

In some embodiments, the communication to the user and the robots in the fleet, between the robots of the fleet, and between the user and the robots in the fleet, occurs via wireless transmission.

In some embodiments, the user's wireless transmission interactions and the robot fleet wireless transmission interactions occur via mobile application transmitted by an electronic device and forwarded to the communication module via: a central server, a fleet management module, and/or a mesh network.

In some embodiments, one preferred method of communication is to use cellular communication between the fleet manager and fleet of robots, (e.g., 3G, 4G, 5G, or the like). Alternatively, the communication between the fleet control module and the robots could occur via satellite communication systems.

In some embodiments, a customer uses an app (either on a cellphone, laptop, tablet, computer or any interactive device) to request a service (e.g., an on-demand food order or for a mobile marketplace robot to come to them).

In some embodiments, the electronic device includes: a phone, a personal mobile device, a personal digital assistant (PDA), a mainframe computer, a desktop computer, a laptop computer, a tablet computer, and/or wearable computing device such as a communication headset, smart glasses, a contact lens or lenses, a digital watch, a bracelet, a ring, jewelry, or a combination thereof.

In accordance with aspects of the present disclosure, the communication module 160 of each robot vehicle can be configured to communicate with a remote human operator. For example, the communication module 160 can communicate environmental videos captured by cameras running at a high frame rate to a remote operator, to enable the remote human operator to visualize the vehicle's surroundings. Further, the communication module 160 can receive instructions from the remote human operator for controlling the conveyance system to move the robot vehicle. Further aspects of remotely operating an autonomous vehicle by a human operator will be described in more detail in connection with FIGS. 5-7.

Figure 8:
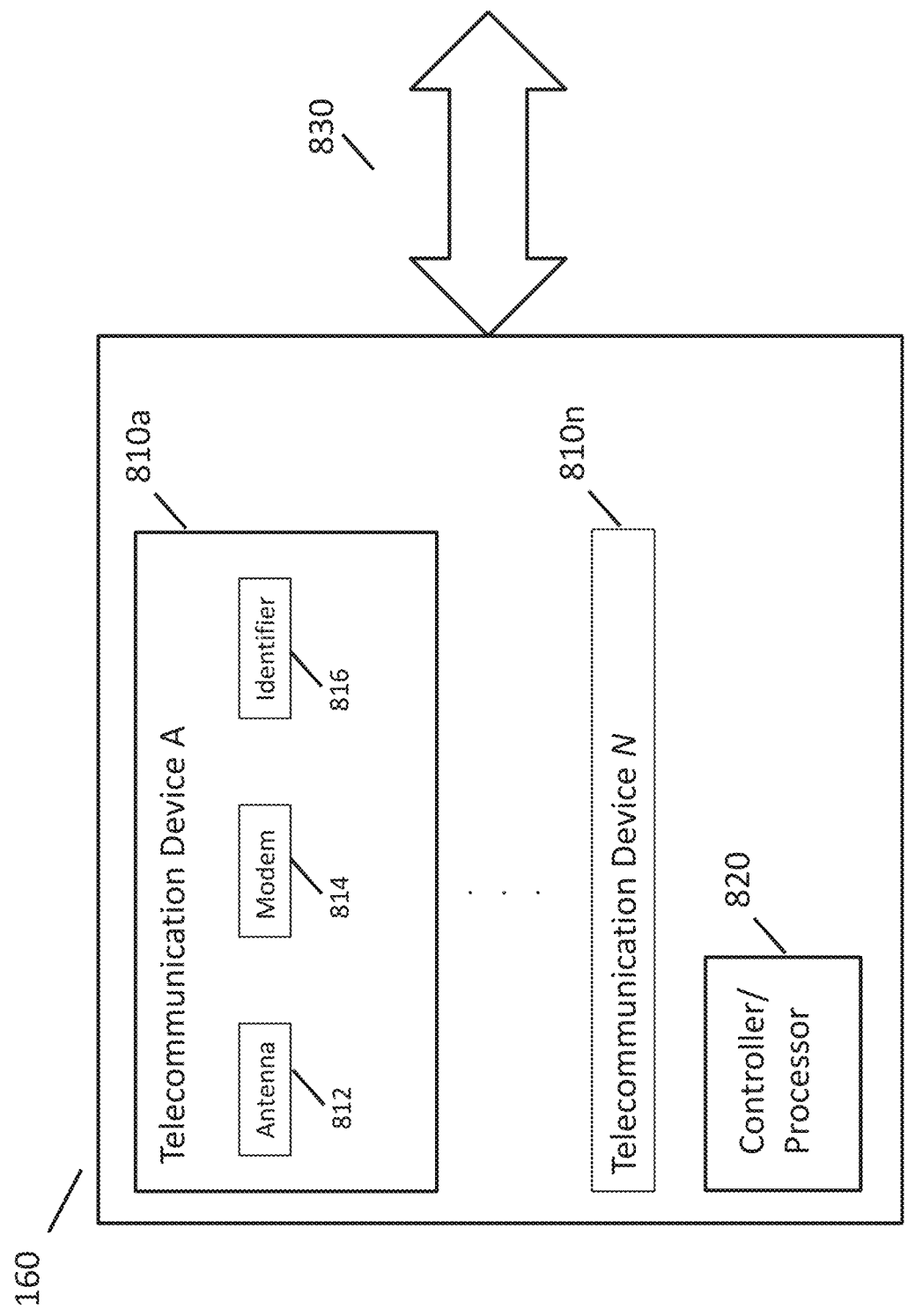
FIG. 8 is a block diagram of exemplary components of the communication module of FIG. 4.

In another aspect of the present disclosure, and with reference also to FIG. 8, the communication module 160 can include multiple telecommunication devices 810a~n that enable more reliable communications by the autonomous vehicle 101. In various embodiments, each telecommunication device can include an antenna 812, a modem 814, and an identifier 816 which identifies the telecommunication device, among other components. In various embodiments, the antenna 812 and the modem 814 can be configured for one or more communication technologies, such as, without limitation, UMTS, CDMA EV-DO, GSM EDGE, 4G LTE, WiMAX, 5G, and/or satellite communications, among others. In various embodiments, the identifier 816 can be implemented by a SIM card. In various embodiments, each telecommunication device 810a~n can operate independently from each other but can also operate simultaneously with each other. For example, various telecommunication devices 810a~n can operate on the same telecommunications network or can operate on different telecommunications networks, such as cellular carriers, and each telecommunication device can have a separate and independent communication connection from the other telecommunication devices 810a~n.

In the illustrated embodiment, the communication module 160 includes a controller or controller 820 which communicates with each telecommunication device 810a~n and can control and coordinate the operations of the telecommunication devices 810a~n. For convenience, the controller/processor 820 will be referred as a "controller," but it will be understood that the controller 820 can be implemented as a processor. In various embodiments, the controller 820 can determine a communication capacity of each telecommunication device 810a~n. In various embodiments, the communication capacity of a telecommunication device can be reported by the telecommunication device to the controller 820. In various embodiments, the communication capacity can be estimated by the controller 820 by determining signal strength, latency, throughput, rate of packet loss, and/or other metrics of a telecommunication device's communication capacity. In various embodiments, the controller 820 can determine such metrics using a predetermined server configured for such testing. In various embodiments, the controller 820 can determine based on such metrics that a telecommunication device is unreliable for performing communications and should not be used at a particular point in time.

In various embodiments, the controller 820 can coordinate which telecommunications devices 810a~n should be used for communications by the autonomous vehicle 101 and how data should be distributed to such telecommunications devices 810a~n. In various embodiments, the controller 820 can exclude any telecommunication device that it determines to be unreliable. Additionally, for telecommunications devices that are estimated to have higher communication capacity, a greater amount or higher rate of data can be sent to such telecommunications devices to be communicated. For telecommunications devices that are estimated to have lower communication capacity, a lesser amount or lower rate of data can be sent to such telecommunications devices to be communicated. The controller 820 can perform such coordination.

Data can be received by the communications module 160 via one or more communications connections 830, which can include hard-wired communication buses, Ethernet cables, and/or wireless connections such as WiFi or Bluetooth, among other connections. The communications connections 830 can communicate with one or more other modules of the autonomous vehicle 101, such as various modules shown in FIG. 4.

The embodiments described above are exemplary, and variations are contemplated to be within the scope of the present disclosure. For example, in various embodiments, the controller/processor 820 may be outside the communication module 160 and can communicate with the telecommunication devices 810*a~n* via the communications connections 830. In various embodiments, the processor 125 of the autonomous vehicle 101 can perform the operations described above. Other variations are contemplated to be within the scope of the present disclosure.

Controller(s) and Processor(s)

In some embodiments, each robot in the robot fleet is equipped with one or more processors 125 capable of both high-level computing for processing as well as low-level safety-critical computing capacity for controlling the hardware. The at least one processor is configured to manage the conveyance system, the navigation module, the sensor system, instructions from the fleet management module, the communication module and the controller.

Further still, in some embodiments, each robot in the robot fleet is equipped with a controller 150 configurable to associate each one of the securable compartments 102, 104 to an assignable customer 202 or provider 204 and provide entry when authorized.

The following will now describe control and processing in connection with remote operation of the robot vehicle by a human operator. As mentioned above, remote operation of a fully-autonomous or a semi-autonomous vehicle may be appropriate in various situations. The capability for a human operator to remotely operate an autonomous vehicle is beneficial even where the autonomous vehicle can be locally operated by a human operator. This capability becomes much more important where the interior space of the autonomous vehicle is configured to maximize commercial carrying capacity and includes no space for a human operator to locally operate the vehicle from within the autonomous vehicle.

In various embodiments, an autonomous vehicle in accordance with aspects of the present disclosure includes an interior space to hold a human operator to locally control the autonomous vehicle, but the vehicle can also be controlled remotely by a remote human operator. In various embodiments, an autonomous vehicle in accordance with aspects of the present disclosure includes no interior space to hold a human operator to locally control the autonomous vehicle. Rather, in accordance with aspects of the present disclosure, a human operator can remotely operate the autonomous vehicle. Such a configuration provides unique considerations. In contrast to an existing configuration in which a human operator located in an autonomous vehicle can override the autonomous operation and take over manual operation to avoid a hazard, various embodiments of the present disclosure do not include space in an autonomous vehicle for a human operator. Because human operation would be remote from the location of the autonomous vehicle, one aspect of the present disclosure provides systems and methods for improving telecommunications with the autonomous vehicle. Remote human operation is merely one example of a situation that would need improved communications with autonomous vehicle. The present disclosure applies to such situations as well.

Referring now to FIG. 4, and as described above herein, an autonomous vehicle includes a processor 125 and a controller 150 for controlling various systems and modules of the autonomous vehicle and includes a communication module 160 for communicating with external systems. In one aspect of the present disclosure, the communication module 160 can communicate with a remote human operator system, which can be part of or separate from the fleet management module 120.

Figure 5:
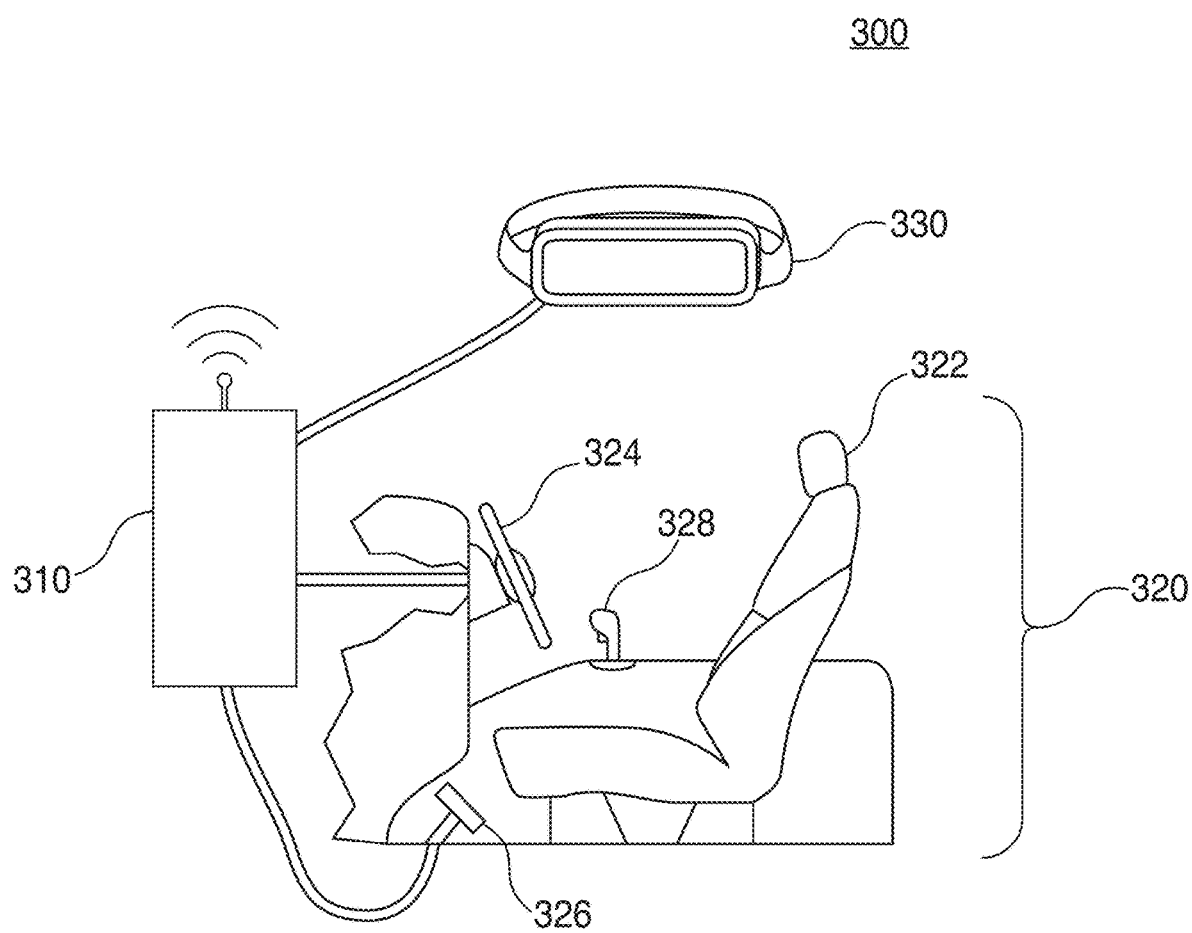
FIG. 5 is a diagram of an exemplary remote human operator system.

FIG. 5 shows an exemplary embodiment of a remote human operator system 300, which includes communication/processing equipment 310 and a human operator station 320. The human operator station 320 can resemble a driver station in a typical automobile and can include a driver seat 322, a steering wheel 324, acceleration and brake pedals 326, a gear shifter 328, and a visual interface 330. In the illustrated embodiment, the visual interface 330 is in the form of a virtual-reality (VR) or augmented-reality (AR) headset. In various embodiments, the visual interface can include one or more display screens, such as LED, LCD, and/or OLED display screens. In various embodiments, the human operator station 320 can be configured to have the approximate touch response of an actual driver station in an automobile. For example, the steering wheel 324 can be configured to have the touch response of power steering in an automobile, and the pedals 326 can be configured to approximate the resistance of pedals in an actual automobile.

The instruments 324-328 of the human operator station 320 can be connected or coupled to communication/processing equipment 310, which enables communication between the human operator station 320 and the autonomous vehicle. In the illustrated embodiment, the human operator station 320 is connected to the communication/processing equipment 310 by physical cables. In various embodiments, the human operator station 320 can be wirelessly coupled to the communication/processing equipment 310 using technologies such as Bluetooth. In various embodiments, the human operator station 320 need not be directly connected to the communication/processing equipment 310 and can be coupled to the communication/processing equipment 310 through intermediate devices and/or networks.

In various embodiments, the communication/processing equipment 310 can establish communications using various communications technologies, including, for example, IEEE 802.11x (WiFi), cellular 3G/4G/5G, wired communications, and/or other wired or wireless communication protocols. The communication/processing equipment 310 includes one or more processors, memories, machine instructions, and/or hardware for processing visual information for display by the visual interface 330. Persons skilled in the field will recognize various ways of communicating, processing, and displaying visual information.

The communication/processing equipment 310 also processes signals from the human operator station 320 and translates them into control instructions for controlling the autonomous vehicle, such as control instructions for controlling the conveyance system (130, FIG. 4) of the autonomous vehicle to perform travel. In this manner, when the human operator turn turns the steering wheel 324, the communication/processing equipment 310 sends corresponding control instructions to the autonomous vehicle to instruct the vehicle to turn. As another example, when the human operator accelerates or brakes using the pedals 326 of the human operator station 320, the communication/processing equipment 310 sends corresponding control instructions to the autonomous vehicle to instruct the vehicle to accelerate or brake, respectively. The embodiments and configurations of FIG. 5 are exemplary, and other configurations and variations are contemplated to be within the scope of the present disclosure. For example, where the autonomous vehicle is a rail vehicle, the remote human operator system 300 may have a human operator station 320 that reflects the actual operator station on a typical non-autonomous vehicle of the same or similar type.

Figure 6:
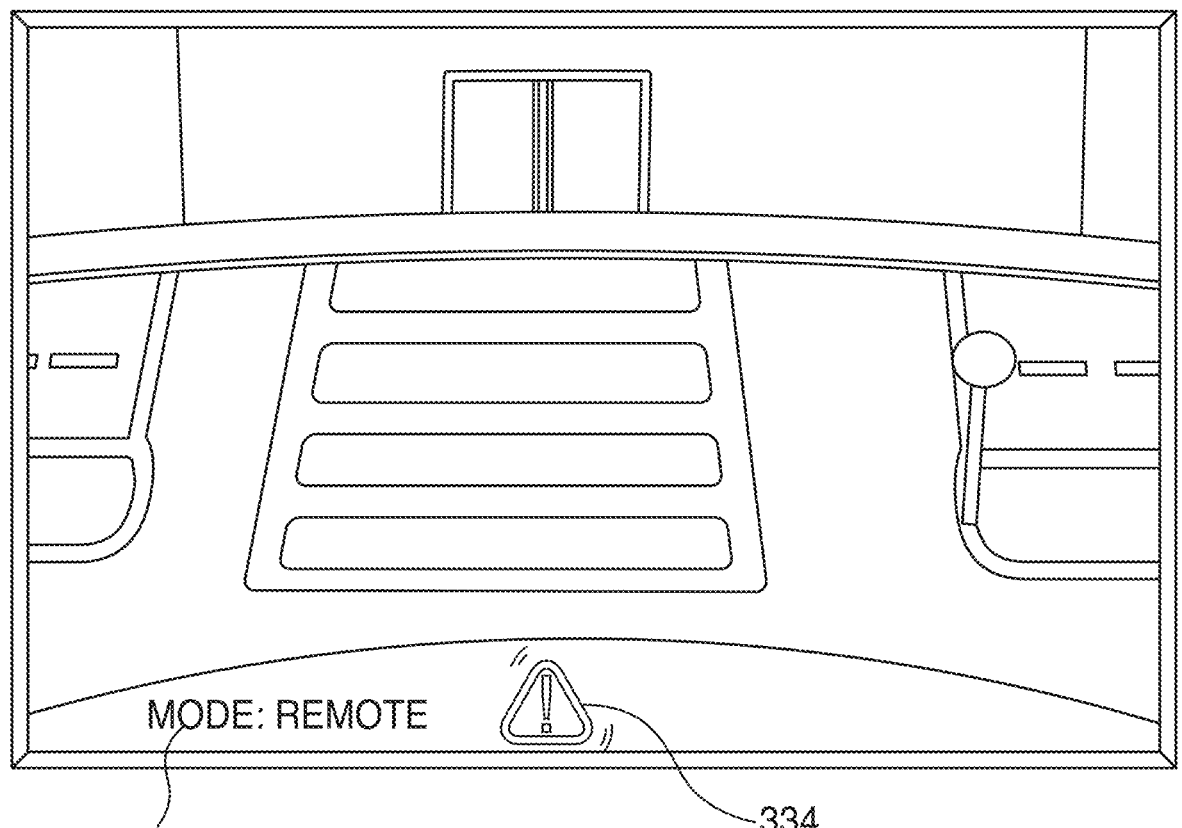
FIG. 6 is a diagram of an exemplary visual display of the remote human operator system of FIG. 5.

Referring also to FIG. 6, there is shown a diagram of an exemplary visual display, which can be displayed in a VR/AR headset or on a display screen, or otherwise. As described above herein, each robot vehicle is equipped with a sensor system which can include cameras, such as for example, those running at a high frame rate akin to video, and other sensors, and include internal computer processing to determine what other objects are around each robot vehicle. In accordance with aspects of the present disclosure, this visual information captured by the sensor system of the autonomous vehicle can be processed and communicated to the remote human operator system 300 for display on the visual interface 330. In various embodiments, the visual display can present the autonomous vehicle's surrounding environment from the point of view of the human operator, such that the displayed content turns as the driver's head turns. In various embodiments, the human operator station 320 can include multiple display screens (not shown) that surround the human operator station, and the display screens can simultaneously display the surrounding environment of the autonomous vehicle. Other configurations and variations are contemplated to be within the scope of the present disclosure.

With continuing reference to FIG. 6, the visual display can include various indicators that inform the human operator of certain conditions. As an example, the visual display can include a mode indicator 332 to specify whether the autonomous vehicle is operating in autonomous mode or in remote operation mode. In the autonomous mode, the human operator's interactions with the human operator station 320 do not affect the movement of the autonomous vehicle 101. In the remote operation mode, the human operator controls the movement of the autonomous vehicle 101 by interacting with the human operator station 320. In various embodiments, the human operator station can include a mechanism (not shown) for switching between autonomous mode and remote operation mode, such as a physical switch or a touch interface button, a voice-activated command, or another mechanism. The illustrated visual display also includes a warning indicator that can alert the human operator to hazard conditions 334. The layout and configuration of the visual display of FIG. 6 is merely exemplary, and variations are contemplated to be within the scope of the present disclosure. For example, where the autonomous vehicle is a rail vehicle, the visual interface of the remote human operator system 300 can be tailored to the visual elements for operating such a vehicle.

Figure 7:
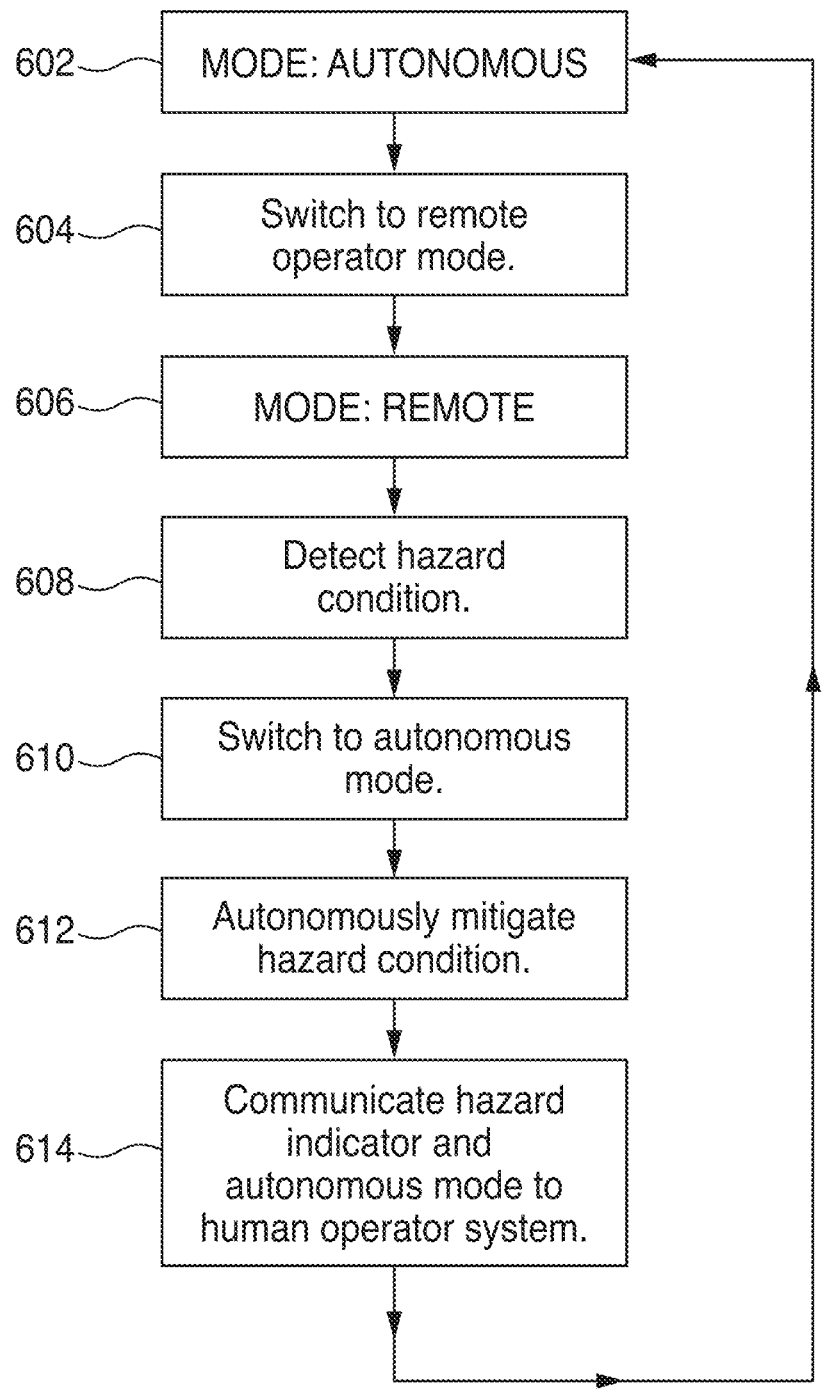
FIG. 7 is a flow chart of an exemplary operation of switching between autonomous mode and remote operation mode.

FIG. 7 is a flow diagram of an operation of the autonomous vehicle of switching between autonomous mode and remote operation mode. The illustrated operation begins with the autonomous vehicle operating in autonomous mode 602, in which no human intervention is needed to cause the autonomous vehicle to travel to various destinations. When the autonomous vehicle receives an instruction to switch from autonomous mode to remote control mode 604, the autonomous vehicle can activate remote control mode and receive control instructions from the remote human operator system.

Accordingly, in the remote operation mode 606, the autonomous vehicle generally does not control its own movement but can continue to monitor the surrounding environment. The remote human operator can enable certain autonomous capabilities while in remote operation mode 606, and the autonomous vehicle can perform the autonomous capabilities based on the monitoring of the surrounding environment. Additionally, if the autonomous vehicle detects a hazard condition 608, the autonomous vehicle can, in various situations, override the remote operation mode and revert to full autonomous mode 610. For example, a hazard condition may include an imminent collision with an object in the autonomous vehicle's surrounding environment, such as another vehicle or a person. Persons skilled in the field will recognize ways to determine that an imminent collision may occur, including using vehicle trajectory and estimating object trajectories. Another hazard condition may include a lane departure when no turn signal has been activated.

After overriding remote operation mode and/or reverting to autonomous mode 610, the autonomous vehicle can operate to autonomously mitigate or avoid the hazard condition 612.

The autonomous vehicle can communicate the hazard indication and the switch to autonomous mode to the remote human operator system 614. In various embodiments, this communication can occur at the time when the hazard condition is detected and the autonomous mode is activated. This communication can cause the visual display of the human operator system to display a hazard indication. In various embodiments, the visual display of the human operator system can display a different hazard indication for different hazard conditions, including different pictorial or text indication. In various embodiments, the remote human operator system can provide an audible, tactile, haptic, and/or other physical or non-physical hazard indication.

In various embodiments, the visual display of the human operator system can highlight objects on the visual display relating to a hazard condition, such as highlighting traffic lights or road signs or displaying them as graphical icons. In various embodiments, the visual display of the human operator system highlight potential hazard conditions, such as surrounding objects such as vehicles, pedestrians, cyclists, obstacles, lights, signs, lane lines, turning lanes, and curbs, among other things. These features can be dynamic performed by the autonomous vehicle and/or the remote human operator system based on detected objects. In various embodiments, the autonomous vehicle and/or the remote human operator system can determine a recommended path around surrounding objects and can provide indications to the human operator as a guide for the recommended path. In various embodiments, the indications can include haptic feedback through steering wheel of the remote human operator system and/or a projected path displayed onto the visual display.

Other variations are contemplated to be within the scope of the present disclosure.

The operation of FIG. 7 can maintain autonomous mode 602 until it receives another instruction to switch to remote operation mode 604. Accordingly, described above herein are systems and methods for enabling remote human operation of an autonomous vehicle, and for the autonomous vehicle to override the remote operation to mitigate hazard conditions.

In accordance with one aspect, and as mentioned above, the present disclosure provides systems and methods for communicating in different communication environments using multiple telecommunication devices and/or using adaptive data compression, including communicating a surrounding environment of an autonomous vehicle to a remote human operator. In various embodiments, adaptive data compression can be implemented in different ways. In various embodiments, data compression can be implemented by the processor 125 and/or controller 150 of FIG. 4, in the communication module 160, and/or in the sensor system 170. In various embodiments, the communication module 160 can perform encoding to compress data using various technologies, such as Lempel-Ziv-Welch compression, run-length encoding, and/or Huffman coding, among others. In various embodiments, the sensor system 170 can perform compression such as image compression for images captured by a camera, including MPEG compression, H.264 compression, and/or H.265 compression, among others. In various embodiments, some or all of the compression described above can be handled by the processor 125 and/or the controller 150 of FIG. 4.

In accordance with an aspect of the present disclosure, the adaptive data compression can be based on the communication capacity of the telecommunication devices 810*a~n* of the communication module 160. A higher communication capacity may require less data compression, and a lower communication capacity may require greater data compression. In various embodiments, the processor 125 of the autonomous vehicle 101 can determine how much data compression is appropriate for an estimate communication capacity. In various embodiments, the adaptive data compression can be implemented by a look-up table which correlates communication capacity with how compression should be performed. For example, in various embodiments, a very high communication capacity may not require any data compression in the communication module 160, the sensor module 170, or the processor 125. In various embodiments, a very low communication capacity may require data compression in each of the communication module 160, the sensor module 170, and the processor 125. In between, various communication capacities may require data compression in just one or two of the communication module 160, the sensor module 170, or the processor 125. In this way, the amount of data compression can be adaptively varied based on communication capacity.

In accordance with an aspect of the present disclosure, the adaptive data compression can be based on the travel speed of the autonomous vehicle 101. For example, a higher travel speed may require faster communication by the autonomous vehicle to the remote human operator, so that the remote human operator can more reliably see the vehicle's surrounding environment as it changes at the higher travel speed. In various embodiments, a higher travel speed can correspond to greater data compression so that the surrounding environment can be conveyed more quickly to the remote human operator. When the autonomous vehicle travels at a lower travel speed, the remote human operator may not need to see changes in the surrounding environment as quickly. In various embodiments, a lower travel speed can correspond to less data compression. In various embodiments, the processor 125 of the autonomous vehicle 101 can determine how much data compression is appropriate for a particular travel speed. In various embodiments, the adaptive data compression can be implemented by a look-up table which correlates travel speed with how compression should be performed.

In various embodiments, an autonomous vehicle can perform adaptive data compression based on both communication capacity and travel speed. It is contemplated that adaptive data compression can depend on factors or considerations other than communication capacity and travel speed. In various embodiments, the adaptive data compression can be implemented by a look-up table which correlates the various factors/considerations with how data compression should be performed.

The embodiments described above are exemplary, and variations are contemplated to be within the scope of the present disclosure. For example, in various embodiments, the adaptive data compression can be based on one or more other metrics, such as communication latency or antenna signal strength in the communication module 160. In various embodiments, each place where data compression occurs can implement different degrees of data compression. For example, the communication module 160 can implement multiple degrees of data compression, and the sensor module 170 can separately implement multiple degrees of data compression. The processor 125 of the autonomous vehicle 101 can determine which degrees of data compression are needed from various modules. In various embodiments, data compression can be implemented by devices or modules different from those shown or described herein. In various embodiments, the autonomous vehicle 101 can include hardware and/or software components that implement video encoding/decoding and/or audio encoding/decoding, and such hardware and/or software can be standalone or can be integrated into other components.

Figure 9:
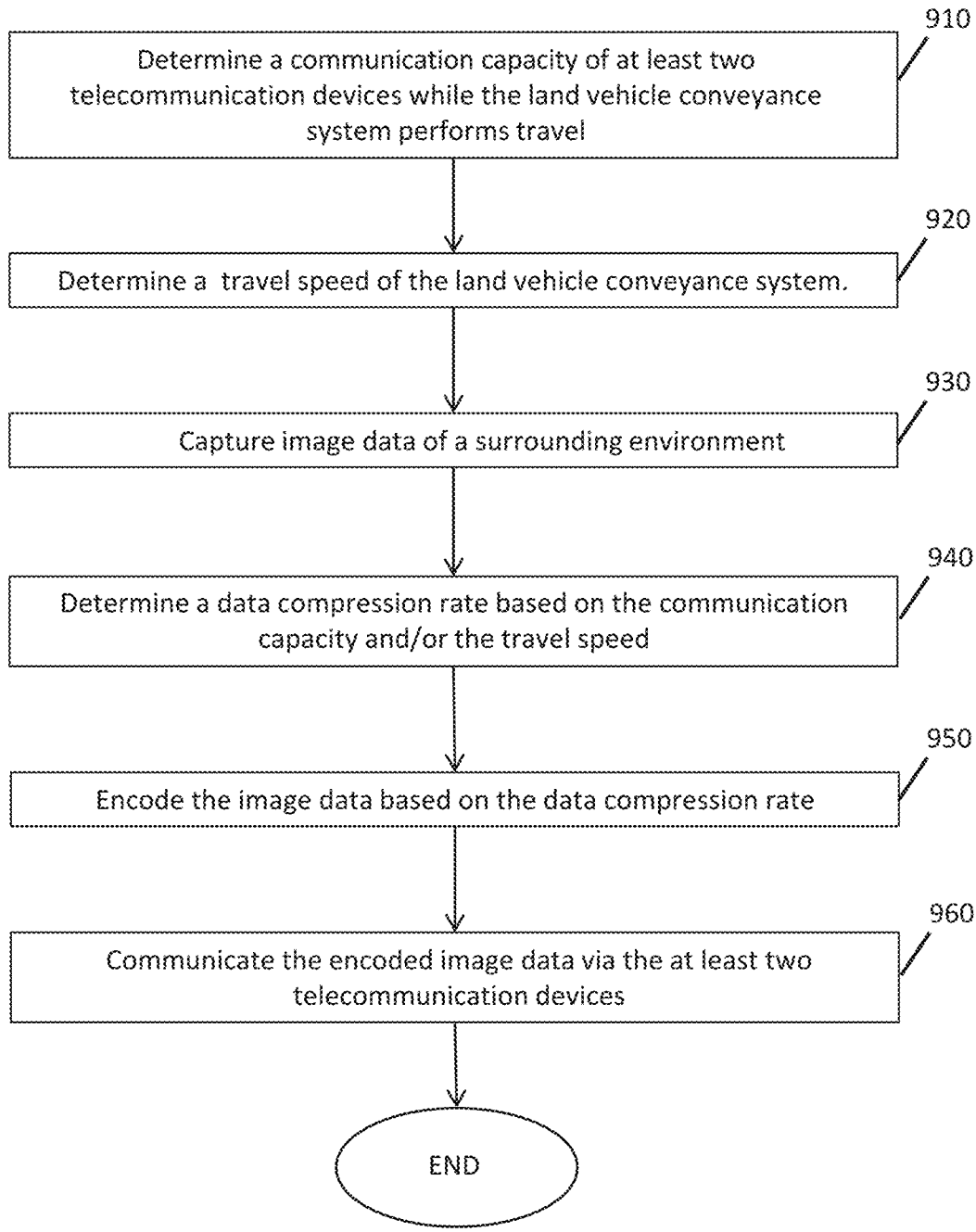
FIG. 9 is a flow diagram of an exemplary operation of the autonomous vehicle.

Referring now to FIG. 9, there is shown an exemplary operation of an autonomous vehicle 101. At block 910, the autonomous vehicle determines a communication capacity of at least two telecommunication devices while the land vehicle conveyance system performs travel. As described above herein, the two or more telecommunication devices can independently perform communications and each telecommunication device can have a different communication capacity. At block 910, the autonomous vehicle determines the travel speed of the land vehicle conveyance system. At block 920, the autonomous vehicle captures image data of the surrounding environment of the vehicle, such as a video of the surrounding environment. At block 940, the autonomous vehicle determines a data compression rate based on the communication capacity or based on the travel speed, or based on both the communication capacity and the travel speed. For example, a higher communication capacity may require less compression while a lower communication capacity may require higher compression. Additionally, a higher travel speed may require lower compression. At block 950, the autonomous vehicle compresses the image data based on the compression rate, and at step 960, the autonomous vehicle communicates the encoded data using the telecommunication devices. In various embodiments, the autonomous vehicle can communicate the encoded data in data packets, and the data packets can be distributed to the telecommunication devices based on their respective communication capacities.

In various embodiments, particular portions of the operation of FIG. 9 may be performed multiple times or successively before other portions are performed. For example, block 940 can be performed successively to update a compression rate as the autonomous vehicle travels. Block 950 can be performed multiple times based on a compression rate and before block 950 updates the compression rate. In various embodiments, block 950 can update the compression rate more often when the autonomous vehicle travels at a higher speed because communications conditions and capacity may change quickly. In various embodiments, block 950 can update the compression rate less often when the autonomous vehicle travels at a lower speed because communications conditions and capacity may change slowly.

In various embodiments, particular portions of the operation of FIG. 9 may be performed in parallel. For example, block 930 can capture image data of the surrounding environment, and in parallel, block 960 can communicate encoded data via the telecommunication devices. Accordingly, the operations of FIG. 9 are exemplary, and variations are contemplated to be within the scope of the present disclosure.

Additional Features

The embodiments disclosed herein are examples of the disclosure and may be embodied in various forms. For instance, although certain embodiments herein are described as separate embodiments, each of the embodiments herein may be combined with one or more of the other embodiments herein. Specific structural and functional details disclosed herein are not to be interpreted as limiting, but as a basis for the claims and as a representative basis for teaching one skilled in the art to variously employ the present disclosure in virtually any appropriately detailed structure. Like reference numerals may refer to similar or identical elements throughout the description of the figures.

The phrases "in an embodiment," "in embodiments," "in various embodiments," "in some embodiments," or "in other embodiments" may each refer to one or more of the same or different embodiments in accordance with the present disclosure. A phrase in the form "A or B" means "(A), (B), or (A and B)." A phrase in the form "at least one of A, B, or C" means "(A); (B); (C); (A and B); (A and C); (B and C); or (A, B, and C)."

Any of the herein described methods, programs, algorithms or codes may be converted to, or expressed in, a programming language or computer program. The terms "programming language" and "computer program," as used herein, each include any language used to specify instructions to a computer, and include (but is not limited to) the following languages and their derivatives: Assembler, Basic, Batch files, BCPL, C, C+, C++, Delphi, Fortran, Java, JavaScript, machine code, operating system command languages, Pascal, Perl, PL1, scripting languages, Visual Basic, metalanguages which themselves specify programs, and all first, second, third, fourth, fifth, or further generation computer languages. Also included are database and other data schemas, and any other meta-languages. No distinction is made between languages which are interpreted, compiled, or use both compiled and interpreted approaches. No distinction is made between compiled and source versions of a program. Thus, reference to a program, where the programming language could exist in more than one state (such as source, compiled, object, or linked) is a reference to any and all such states. Reference to a program may encompass the actual instructions and/or the intent of those instructions.

The systems described herein may also utilize one or more controllers to receive various information and transform the received information to generate an output. The controller may include any type of computing device, computational circuit, or any type of processor or processing circuit capable of executing a series of instructions that are stored in a memory. The controller may include multiple processors and/or multicore central processing units (CPUs) and may include any type of processor, such as a microprocessor, digital signal processor, microcontroller, programmable logic device (PLD), field programmable gate array (FPGA), or the like. The controller may also include a memory to store data and/or instructions that, when executed by the one or more processors, causes the one or more processors to perform one or more methods and/or algorithms.

Any of the herein described methods, programs, algorithms or codes may be converted to, or expressed in, a programming language or computer program. The terms "programming language" and "computer program," as used herein, each include any language used to specify instructions to a computer, and include (but is not limited to) the following languages and their derivatives: Assembler, Basic, Batch files, BCPL, C, C+, C++, Delphi, Fortran, Java, JavaScript, machine code, operating system command languages, Pascal, Perl, PL1, scripting languages, Visual Basic, metalanguages which themselves specify programs, and all first, second, third, fourth, fifth, or further generation computer languages. Also included are database and other data schemas, and any other meta-languages. No distinction is made between languages which are interpreted, compiled, or use both compiled and interpreted approaches. No distinction is made between compiled and source versions of a program. Thus, reference to a program, where the programming language could exist in more than one state (such as source, compiled, object, or linked) is a reference to any and all such states. Reference to a program may encompass the actual instructions and/or the intent of those instructions.

It should be understood that the foregoing description is only illustrative of the present disclosure. Various alternatives and modifications can be devised by those skilled in the art without departing from the disclosure. Accordingly, the present disclosure is intended to embrace all such alternatives, modifications and variances. The embodiments described with reference to the attached drawing figures are presented only to demonstrate certain examples of the disclosure. Other elements, steps, methods, and techniques that are insubstantially different from those described above and/or in the appended claims are also intended to be within the scope of the disclosure.

What is claimed is:

1. An autonomous land vehicle comprising:
    a land vehicle conveyance system;
    at least two telecommunication devices that are configured to perform wireless communication independently of each other and that are capable of simultaneously performing the wireless communication while the land vehicle conveyance system performs travel;
    an imaging device configured to capture image data of a surrounding environment;
    a video encoder configured to encode the image data;
    one or more processors; and
    at least one memory coupled to the one or more processors and storing instructions which, when executed by the one or more processors, cause the autonomous land vehicle to:
        travel using the land vehicle conveyance system;

determine a communication capability of the at least two telecommunication devices while the land vehicle conveyance system performs travel;

successively determine a compression rate for the video encoder based on a travel speed of the autonomous land vehicle;

encode the image data using the video encoder based on the compression rate to generate encoded data; and communicate the encoded data using at least one of the at least two telecommunication devices based on the communication capability.

2. The autonomous land vehicle of claim 1, wherein the communication capability includes a total communication capacity of the at least two telecommunication devices.

3. The autonomous land vehicle of claim 2, wherein the compression rate for a first lower total communication capacity is higher than the compression rate for a second higher total communication capacity.

4. The autonomous land vehicle of claim 1, wherein the compression rate is greater for higher travel speeds.

5. The autonomous land vehicle of claim 1, wherein the compression rate is no compression when the communication capability is sufficient to communicate the image data without compression.

6. The autonomous land vehicle of claim 1, wherein the instructions, when executed by the one or more processors, cause the autonomous land vehicle to:

determine that communication is unstable over a first telecommunication device of the at least two telecommunication devices, and communicate the encoded data without using the first telecommunication device.

7. The autonomous land vehicle of claim 1, wherein the instructions, when executed by the one or more processors, cause the autonomous land vehicle to communicate the encoded data using the at least two telecommunication devices simultaneously.

8. The autonomous land vehicle of claim 1, wherein the instructions, when executed by the one or more processors, cause the autonomous land vehicle to:

successively determine the communication capability of the at least two telecommunication devices.

9. The autonomous land vehicle of claim 8, wherein a time period for successively determining the communication capability and a time period for successively determining the compression rate are based on the travel speed.

10. The autonomous land vehicle of claim 9, wherein the time period for successively determining the communication capability and the time period for successively determining the compression rate are shorter for greater travel speeds.

11. A method in an autonomous land vehicle having a land vehicle conveyance system and at least two telecommunication devices that are configured to perform wireless communication independently of each other and that are capable of simultaneously performing the wireless communication while the autonomous land vehicle travels, the method comprising:

capturing image data of a surrounding environment of the autonomous land vehicle;

traveling using the land vehicle conveyance system;

determining a communication capability of the at least two telecommunication devices while the land vehicle conveyance system performs travel;

successively determining a compression rate based on a travel speed of the autonomous land vehicle;

encoding the image data based on the compression rate to generate encoded data; and communicating the encoded data using at least one of the at least two telecommunication devices based on the communication capability.

12. The method of claim 11, wherein the communication capability includes a total communication capacity of the at least two telecommunication devices.

13. The method of claim 12, wherein the compression rate is greater for higher total communication capacities.

14. The method of claim 11, wherein the compression rate is greater for higher travel speeds.

15. The method of claim 11, wherein determining the communication capability of the at least two telecommunication devices includes successively determining the communication capability of the at least two telecommunication devices.

16. The method of claim 15, wherein a time period for successively determining the communication capability and a time period for successively determining the compression rate are based on the travel speed.

17. A non-transitory computer readable memory storing instructions that, when executed by one or more processors on an autonomous land vehicle, cause the one or more processors to perform operations including:

capturing image data of a surrounding environment of the autonomous land vehicle as the autonomous land vehicle is traveling;

determining a communication capability of at least two telecommunication devices on the autonomous land vehicle traveling;

successively determining a compression rate based on a travel speed of the autonomous land vehicle;

encoding the image data based on the compression rate to generate encoded data; and communicating the encoded data using at least one of the at least two telecommunication devices based on the communication capability.

18. The non-transitory computer readable memory of claim 17, wherein the communication capability includes a total communication capacity of the at least two telecommunication devices.

19. The non-transitory computer readable memory of claim 18, wherein the compression rate is greater for higher total communication capacities.

20. The non-transitory computer readable memory of claim 17, wherein the compression rate is greater for higher travel speeds.

* * * * *